(12) United States Patent
Liu et al.

(10) Patent No.: US 12,146,200 B1
(45) Date of Patent: Nov. 19, 2024

(54) METHOD AND DEVICE FOR CONTROLLING TEMPERATURE OF MOLTEN STEEL DURING LADLE FURNACE (LF) REFINING BASED ON INTERPRETABLE MACHINE LEARNING

(71) Applicant: University of Science and Technology Beijing, Beijing (CN)

(72) Inventors: Qing Liu, Beijing (CN); Zicheng Xin, Beijing (CN); Jiangshan Zhang, Beijing (CN)

(73) Assignee: University of Science and Technology Beijing, Beijing (CN)

( * ) Notice: Subject to any disclaimer, the term of this patent is extended or adjusted under 35 U.S.C. 154(b) by 0 days.

(21) Appl. No.: 18/655,340

(22) Filed: May 6, 2024

(30) Foreign Application Priority Data

Nov. 17, 2023 (CN) .......................... 202311541320.3

(51) Int. Cl.
  *C21C 5/30* (2006.01)
  *C21C 7/00* (2006.01)

(52) U.S. Cl.
  CPC .............. *C21C 5/30* (2013.01); *C21C 7/0075* (2013.01); *C21C 2300/06* (2013.01)

(58) Field of Classification Search
  CPC ...... C21C 5/30; C21C 7/0075; C21C 2300/06
  USPC .......................................................... 700/95
  See application file for complete search history.

(56) References Cited

U.S. PATENT DOCUMENTS

| 4,104,058 A * | 8/1978 | Grenfell ..................... C21C 5/30 75/386 |
| 7,396,378 B2 * | 7/2008 | Sato .......................... C21C 7/04 75/508 |
| 10,323,291 B2 * | 6/2019 | Al-Ghamdi ........... C21C 7/0025 |
| 11,326,217 B1 * | 5/2022 | Liu .......................... C21C 7/064 |

(Continued)

FOREIGN PATENT DOCUMENTS

| CN | 102867220 A | 1/2013 |
| CN | 110955956 A | 4/2020 |
| CN | 115659709 A | 1/2023 |

OTHER PUBLICATIONS

Fang, et al. "Artificial Neural Network Model—Molten Steel Transportation Process", Process 2023,11,1629; May 26, 2023 (Year: 2023).*

*Primary Examiner* — Md Azad
(74) *Attorney, Agent, or Firm* — True Shepherd LLC; Andrew C. Cheng (57) ABSTRACT

A method for controlling a temperature of a molten steel during ladle furnace (LF) refining based on interpretable machine learning includes: acquiring process data of the LF refining and a target temperature of the molten steel during the LF refining; acquiring a prediction model for the temperature of the molten steel during the LF refining; calculating a base value for prediction of the temperature of the molten steel, SHapley Additive explanations (SHAP) values of key factor parameters, and a relationship trend between the key factor parameters and the SHAP values; and calculating a predicted value of the temperature of the molten steel during the LF refining, and acquiring a control result for the temperature of the molten steel during the LF refining according to the relationship trend and the predicted value of the temperature of the molten steel during the LF refining.

8 Claims, 6 Drawing Sheets

(56) References Cited

U.S. PATENT DOCUMENTS

2011/0049252 A1 3/2011 Lu et al.
2023/0368021 A1 11/2023 Bao et al.

* cited by examiner

METHOD AND DEVICE FOR CONTROLLING TEMPERATURE OF MOLTEN STEEL DURING LADLE FURNACE (LF) REFINING BASED ON INTERPRETABLE MACHINE LEARNING

CROSS-REFERENCE TO RELATED APPLICATIONS

This application claims priority to Chinese Patent Application No. 202311541320.3 with a filing date of Nov. 17, 2023. The content of the aforementioned application, including any intervening amendments thereto, is incorporated herein by reference.

TECHNICAL FIELD

The present disclosure relates to the technical field of ferrous metallurgy, and in particular to a method and device for controlling a temperature of a molten steel during ladle furnace (LF) refining based on interpretable machine learning.

BACKGROUND

With the high-quality development of the iron and steel industry, the eco-friendliness and intelligence have become major development directions for steelmaking plants. LF refining is an intermediate procedure in a steelmaking-continuous casting production process, and the reasonable control of the temperature of the molten steel during LF refining is one of the key factors affecting the quality of the molten steel and the smooth proceed of continuous casting. Therefore, the accurate prediction and control of the temperature of the molten steel is of great significance to optimizing the LF refining procedure, reducing the production cost, and improving the production efficiency.

LF refining involves complicated high-temperature physical and chemical reaction processes. In view of the problem that it is difficult to allow the continuous temperature measurement of the molten steel during actual production and the temperature of the molten steel is usually controlled based on the experience of operators and various temperature measurements, research scholars have developed different methods for predicting the temperature of the molten steel. For example, the patent CN202310510682.X discloses an error correction method and system for predicting a temperature of a molten steel during LF refining, where an error of the current heat is calculated with an error of a heat among historical heats similar to the current heat on a prediction model, and a predicted value of the current heat on the prediction model is corrected. The patent CN202211688892.X discloses a method and system for predicting a temperature of a molten steel during LF refining.

However, it can be seen through literature research that, although metallurgical mechanism models in the existing public data can directly describe energy changes of a molten steel at different stages and under different conditions, the construction of a metallurgical mechanism model usually requires a lot of assumptions and simplifications, and there are linear and nonlinear relationships between input and output variables of LF refining, resulting in a poor model accuracy. Machine learning models rely too much on data, lack the consideration of metallurgical mechanisms, and sometimes may even have large deviations due to the interference of abnormal data. A hybrid model of a metallurgical mechanism model and a machine learning model not only overcomes the computational difficulties caused by the difficult determination of key parameters and the too many assumptions of a metallurgical mechanism model, but also overcomes the deficiency that a machine learning model lacks metallurgical mechanism guidance and relies too much on data. Hybrid modeling is currently the most widely-used modeling strategy. Although a hybrid model construction process adopts a metallurgical mechanism and an advanced machine learning algorithm and leads to a high accuracy, there are still black-box problems such as opaque decision-making of a model and lack of interpretation of prediction results, which makes it difficult for on-site operators to grasp a working principle of a machine learning model, reasonably optimize process parameters according to a model, and well apply and optimize a model. In addition, the process parameters of LF refining in a production field are perceptually adjusted basically based on personal experience, which leads to a large fluctuation in a temperature of a molten steel and thus affects the improvement of a molten steel quality and a production efficiency. Therefore, the accurate prediction of a temperature of a molten steel and the accurate adjustment of process parameters are currently urgent problems to be solved to allow the stable control of a temperature of a molten steel.

SUMMARY

In view of the technical problem that the prediction models for a temperature of a molten steel during LF refining in the prior art have a poor application effect and unguaranteed reliability due to the lack of decision-making transparency and interpretability, the present disclosure is provided on the basis of detailed analysis of production needs and existing technical data. The present disclosure is intended to assist in the guidance of an on-site operating procedure, allow the accurate control of a temperature of a molten steel, and facilitate the intelligent development of iron and steel processes.

To solve the above technical problem, the present disclosure provides the following technical solutions:

In a first aspect, the present disclosure provides a method for controlling a temperature of a molten steel during LF refining based on interpretable machine learning. The method is implemented by an electronic device. The method includes:

S1, acquiring process data of the LF refining and a target temperature of the molten steel during the LF refining;

S2, acquiring a prediction model for the temperature of the molten steel during the LF refining according to the process data of the LF refining and the target temperature of the molten steel during the LF refining;

S3, calculating a base value for prediction of the temperature of the molten steel, SHapley Additive explanations (SHAP) values of key factor parameters, and a relationship trend between the key factor parameters and the SHAP values according to the prediction model for the temperature of the molten steel during the LF refining; and S4, calculating a predicted value of the temperature of the molten steel during the LF refining according to the base value for the prediction of the temperature of the molten steel and the SHAP values of the key factor parameters, and acquiring a control result for the temperature of the molten steel during the LF refining according to the relationship trend and the predicted value of the temperature of the molten steel during the LF refining.

Optionally, the process data of the LF refining in the S1 includes the key factor parameters affecting a change of the temperature of the molten steel and amounts of added materials.

The key factor parameters include a turnover cycle of ladle, a molten steel weight, a starting temperature of molten steel, a refining time, an electrode heating time, and an argon consumption.

The added materials include an alloy material, a slag-making material, and a silicon-calcium wire.

Optionally, the acquiring a prediction model for the temperature of the molten steel during the LF refining according to the process data of the LF refining and the target temperature of the molten steel during the LF refining in the S2 includes:

S21, calculating an actual temperature of the molten steel during the LF refining according to the target temperature of the molten steel during the LF refining;

S22, constructing a model data set according to the actual temperature of the molten steel during the LF refining and the key factor parameters, preprocessing the model data set to obtain a preprocessed model data set, and dividing the preprocessed model data set into a training set and a test set;

S23, performing hyperparameter optimization on machine learning models based on the training set, k-fold cross-validation, and a hyperparameter optimization method to obtain optimal hyperparameters for a plurality of machine learning models; and S24, evaluating the plurality of machine learning models according to the test set after the hyperparameter optimization, and acquiring an optimal prediction model for the temperature of the molten steel during the LF refining according to performance indexes of the plurality of machine learning models.

Optionally, the calculating an actual temperature of the molten steel during the LF refining according to the target temperature of the molten steel during the LF refining in the S21 includes:

calculating the actual temperature $T_1$ of the molten steel during the LF refining according to the target temperature of the molten steel during the LF refining and a thermal equilibrium, as shown in the following formula (1):

$$T_1 = T_{measured} - \Delta T_{addition} \quad (1)$$

where $T_{measured}$ represents the target temperature of the molten steel during the LF refining and $\Delta T_{addition}$ represents a temperature change of the molten steel caused by an added material.

Optionally, the preprocessing in the S22 includes deleting repeating data and abnormal data.

The abnormal data includes abnormal data caused by a sensor failure, heat data when a molten steel weight is lower than a minimum processing capacity or higher than a maximum processing capacity, heat data when a heating time during the LF refining is longer than a preset time, and heat data when a composition of a molten steel at a refining end point is not in a target composition range of a target steel grade.

Optionally, the hyperparameter optimization method in the S23 includes a random search technique, a Bayesian optimization (BO) technique, and a grey wolf optimization (GWO) technique.

Optionally, the machine learning models in the S23 include an extreme gradient boosting (XGBoost) model and a light gradient boosting machine (LGBM) model.

Optionally, the performance indexes in the S24 include a determination coefficient $R^2$, a root mean square error (RMSE), a mean absolute error (MAE), and a hit rate within a preset error range.

Optionally, the calculating a predicted value of the temperature of the molten steel during the LF refining according to the base value for the prediction of the temperature of the molten steel and the SHAP values of the key factor parameters, and acquiring a control result for the temperature of the molten steel during the LF refining according to the relationship trend and the predicted value of the temperature of the molten steel during the LF refining includes:

S41, calculating the predicted value $T_{predict}$ of the temperature of the molten steel during the LF refining according to the base value for the prediction of the temperature of the molten steel and the SHAP values of the key factor parameters, as shown in the following formula (2):

$$T_{predict} = T_{basevalue} + \Sigma_j \text{SHAPvalue}_j \quad (2)$$

where $T_{basevalue}$ represents the base value for the prediction of the temperature of the molten steel, j represents a key factor parameter, and SHAPvalue$_j$ represents an SHAP value corresponding to the key factor parameter j; and S42, calculating a difference between the predicted value of the temperature of the molten steel during the LF refining and an actual temperature of the molten steel during the LF refining, and adjusting the key factor parameters according to the relationship trend until the difference is within a preset range to obtain adjusted key factor parameters, so as to obtain the control result for the temperature of the molten steel during the LF refining.

In a second aspect, the present disclosure provides a device for controlling a temperature of a molten steel during LF refining based on interpretable machine learning. The device is configured to implement the method for controlling a temperature of a molten steel during LF refining based on interpretable machine learning. The device includes:

an acquisition module configured to acquire process data of the LF refining and a target temperature of the molten steel during the LF refining;

a model construction module configured to acquire a prediction model for the temperature of the molten steel during the LF refining according to the process data of the LF refining and the target temperature of the molten steel during the LF refining;

a calculation module configured to calculate a base value for prediction of the temperature of the molten steel, SHAP values of key factor parameters, and a relationship trend between the key factor parameters and the SHAP values according to the prediction model for the temperature of the molten steel during the LF refining; and an output module configured to calculate a predicted value of the temperature of the molten steel during the LF refining according to the base value for the prediction of the temperature of the molten steel and the SHAP values of the key factor parameters, and acquire a control result for the temperature of the molten steel during the LF refining according to the relationship trend and the predicted value of the temperature of the molten steel during the LF refining.

Optionally, the process data of the LF refining includes the key factor parameters affecting a change of the temperature of the molten steel and amounts of added materials.

The key factor parameters include a turnover cycle of ladle, a molten steel weight, a starting temperature of molten steel, a refining time, an electrode heating time, and an argon consumption.

The added materials include an alloy material, a slag-making material, and a silicon-calcium wire.

Optionally, the model construction module is further configured to:

S21, calculate an actual temperature of the molten steel during the LF refining according to the target temperature of the molten steel during the LF refining;

S22, construct a model data set according to the actual temperature of the molten steel during the LF refining and the key factor parameters, preprocess the model data set to obtain a preprocessed model data set, and divide the preprocessed model data set into a training set and a test set;

S23, subject machine learning models to hyperparameter optimization based on the training set, k-fold cross-validation, and a hyperparameter optimization method to obtain optimal hyperparameters for a plurality of machine learning models; and S24, evaluate the plurality of machine learning models according to the test set after the hyperparameter optimization, and acquire an optimal prediction model for the temperature of the molten steel during the LF refining according to performance indexes of the plurality of machine learning models.

Optionally, the model construction module is further configured to:

calculate the actual temperature $T_1$ of the molten steel during the LF refining according to the target temperature of the molten steel during the LF refining and a thermal equilibrium, as shown in the following formula (1):

$$T_1 = T_{measured} - \Delta T_{addition} \quad (1)$$

where $T_{measured}$ represents the target temperature of the molten steel during the LF refining and $\Delta T_{addition}$ represents a temperature change of the molten steel caused by an added material.

Optionally, the preprocessing includes deleting repeating data and abnormal data.

The abnormal data includes abnormal data caused by a sensor failure, heat data when a molten steel weight is lower than a minimum processing capacity or higher than a maximum processing capacity, heat data when a heating time during the LF refining is longer than a preset time, and heat data when a composition of a molten steel at a refining end point is not in a target composition range of a target steel grade.

Optionally, the hyperparameter optimization method includes a random search technique, a BO technique, and a GWO technique.

Optionally, the machine learning models include an XGBoost model and an LGBM model.

Optionally, the performance indexes include a determination coefficient $R^2$, an RMSE, an MAE, and a hit rate within a preset error range.

Optionally, the output module is further configured to:

S41, calculate the predicted value $T_{predict}$ of the temperature of the molten steel during the LF refining according to the base value for the prediction of the temperature of the molten steel and the SHAP values of the key factor parameters, as shown in the following formula (2):

$$T_{predict} = T_{basevalue} + \Sigma_j SHAPvalue_j \quad (2)$$

where $T_{basevalue}$ represents the base value for the prediction of the temperature of the molten steel, j represents a key factor parameter, and $SHAPvalue_j$ represents an SHAP value corresponding to the key factor parameter j; and S42, calculate a difference between the predicted value of the temperature of the molten steel during the LF refining and an actual temperature of the molten steel during the LF refining, and adjust the key factor parameters according to the relationship trend until the difference is within a preset range to obtain adjusted key factor parameters, so as to obtain the control result for the temperature of the molten steel during the LF refining.

In a third aspect, the present disclosure provides an electronic device, including a processor and a memory, where at least one instruction is stored in the memory, and the at least one instruction is loaded and executed by the processor to implement the method for controlling a temperature of a molten steel during LF refining based on interpretable machine learning.

In a fourth aspect, the present disclosure provides a computer-readable storage medium, where at least one instruction is stored in the computer-readable storage medium, and the at least one instruction is loaded and executed by the processor to implement the method for controlling a temperature of a molten steel during LF refining based on interpretable machine learning.

Compared with the prior art, the above technical solutions have at least the following beneficial effects:

In the above technical solutions, actual working conditions of LF refining can be adjusted, which is conducive to enhancing the understanding of operators for decision-making of models. The present disclosure can guide an operator to make an accurate, scientific, and reasonable decision for the adjustment of process parameters in an actual operation, thereby improving a production efficiency, optimizing the process parameters, allowing the accurate control of a temperature of a molten steel, ensuring a quality of a molten steel, and reducing a production risk.

BRIEF DESCRIPTION OF THE DRAWINGS

In order to describe the technical solutions in the embodiments of the present disclosure clearly, the accompanying drawings required to describe the embodiments are briefly described below. Apparently, the accompanying drawings described below are only some embodiments of the present disclosure. Those of ordinary skill in the art may further obtain other accompanying drawings based on these accompanying drawings without creative efforts.

DETAILED DESCRIPTION OF THE EMBODIMENTS

To make the objectives, technical solutions, and advantages of the embodiments of the present disclosure clear, the technical solutions in the embodiments of the present disclosure are clearly and completely described below with reference to the accompanying drawings in the embodiments of the present disclosure. Apparently, the described embodiments are merely some rather than all of the embodiments of the present disclosure. All other embodiments obtained by those of ordinary skill in the art based on the described embodiments of the present disclosure without creative efforts should fall within the protection scope of the present disclosure.

Figure 1:
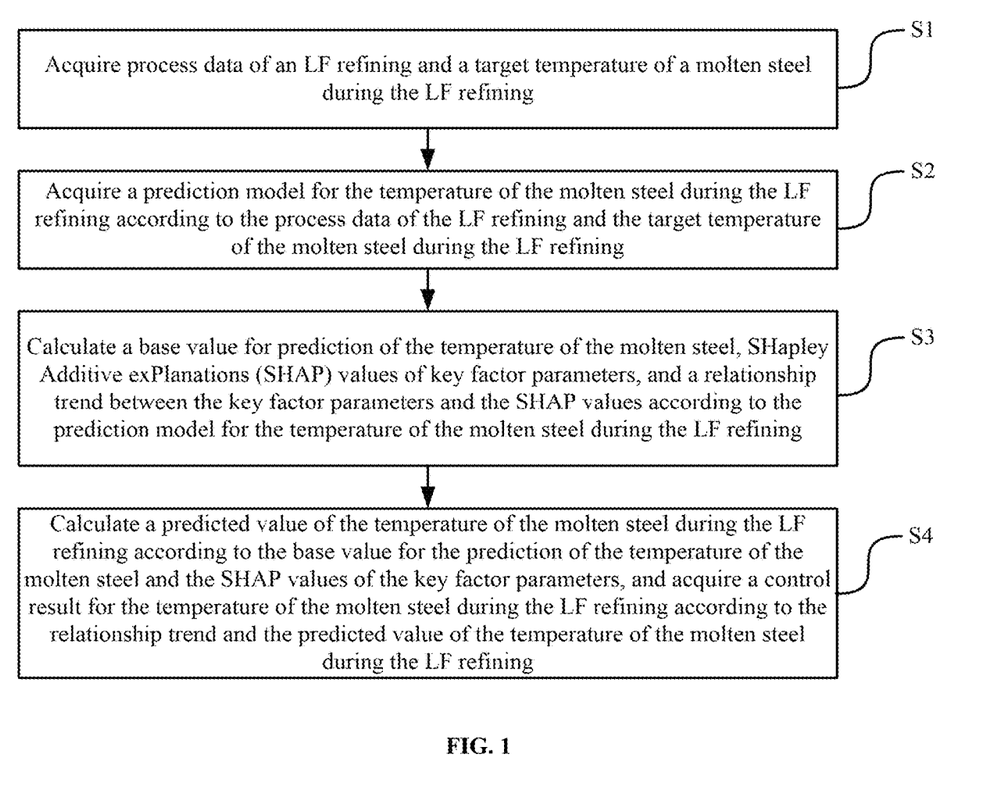
FIG. 1 is a schematic flow chart of a method for controlling a temperature of a molten steel during LF refining based on interpretable machine learning provided in an embodiment of the present disclosure.
Figure 2A:
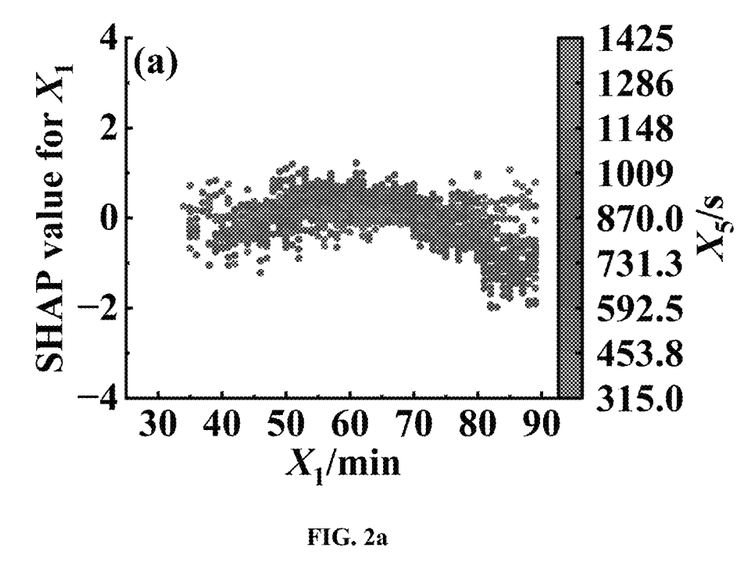
FIG. 2a to FIG. 2f show SHAP dependence graphs of different key factor parameters affecting a temperature change of a molten steel provided in an embodiment of the present disclosure.
Figure 2B:
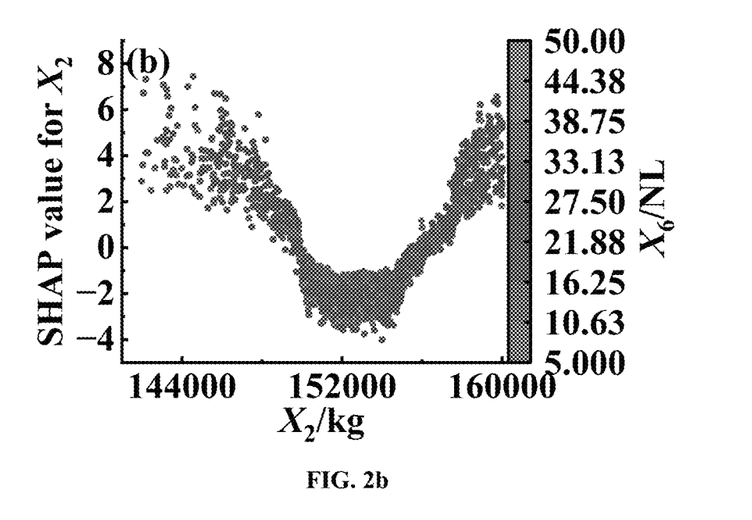
Figure 2C:
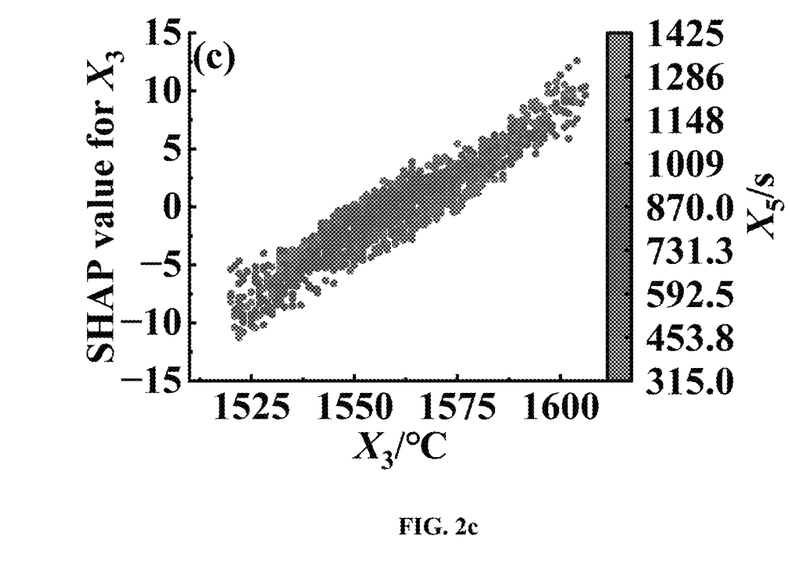
Figure 2D:
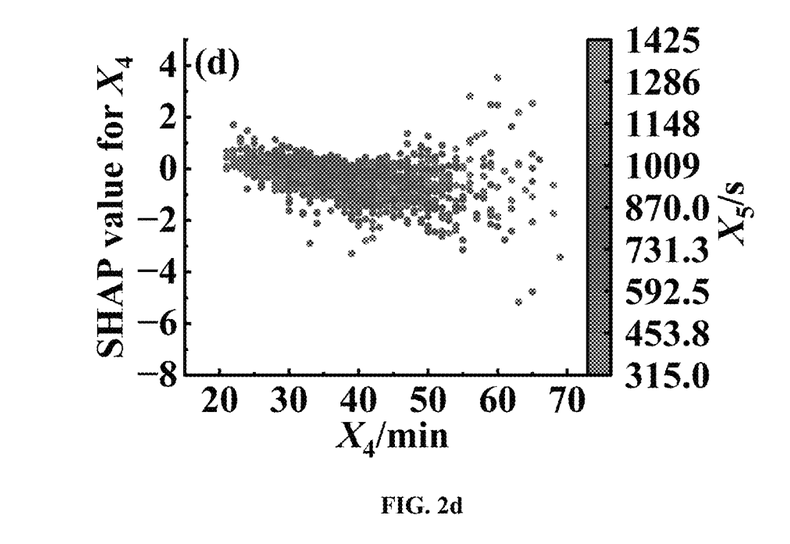
Figure 2E:
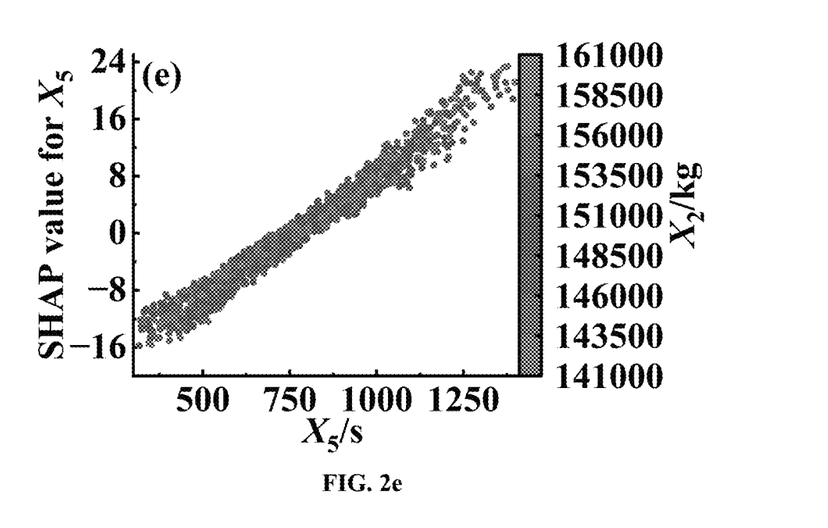
Figure 2F:
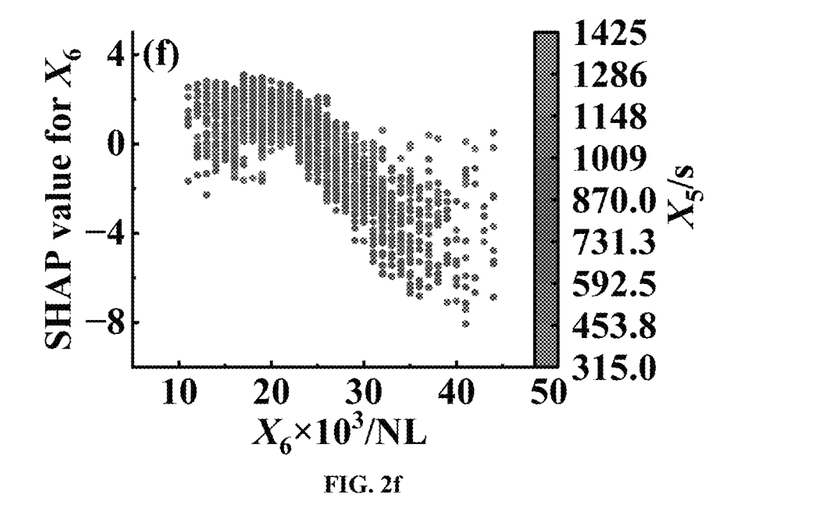

As shown in FIG. 1, an embodiment of the present disclosure provides a method for controlling a temperature of a molten steel during LF refining based on interpretable machine learning. The method can be implemented by an electronic device. As shown by the flow chart of the method for controlling a temperature of a molten steel during LF refining based on interpretable machine learning in FIG. 1, the method can include the following steps:

S1, Process data of the LF refining and a target temperature of the molten steel during the LF refining are acquired.

The process data of the LF refining can include key factor parameters affecting a change of the temperature of the molten steel and amounts of added materials.

The key factor parameters can include a turnover cycle of ladle, a molten steel weight, a starting temperature of molten steel, a refining time, an electrode heating time, and an argon consumption.

The added materials can include an alloy material, a slag-making material, and a silicon-calcium wire.

Specifically, the alloy material can include an aluminum wire and high-carbon ferromanganese, the slag-making material can include lime and a slag agent, and main components of the slag agent include $CaF_2$ and unavoidable impurities.

In a feasible embodiment, the process data of the LF refining can include a turnover cycle of ladle ($X_1$), a molten steel weight ($X_2$), a starting temperature of molten steel ($X_3$), a refining time ($X_4$), an electrode heating time ($X_5$), an argon consumption ($X_6$), an addition amount of an alloy material (an aluminum wire and high-carbon ferromanganese), an addition amount of a slag-making material (lime and a slag agent), and an addition amount of a silicon-calcium wire. The statistical descriptions of the different parameters and the addition amounts of the alloy material and the slag-making material are shown in Table 1. Main components of the slag agent are $CaF_2$ and the balance of unavoidable impurities.

TABLE 1 statistical descriptions of the different parameters and the addition amounts of the alloy material and the slag-making material

| | Variable | | | | | | | | | |
|---|---|---|---|---|---|---|---|---|---|---|
| Unit | $X_1$ min | $X_2$ kg | $X_3$ ° C. | $X_4$ min | $X_5$ s | $X_6$ ×10$^4$ NL | Aluminum wire m | High-carbon ferromanganese kg | Lime kg | Slag agent kg | Silicon-calcium wire m |
| Mean value | 64.40 | 153180.79 | 1560.86 | 37.92 | 776.91 | 2.39 | 318.63 | 81.33 | 589.41 | 118.28 | 126.99 |
| Minimum value | 34 | 141980 | 1520 | 21 | 289 | 1.1 | 0 | 0 | 0 | 0 | 0 |
| Maximum value | 89 | 160000 | 1606 | 69 | 1427 | 4.4 | 1624 | 682 | 1868 | 958 | 1133 |

S2, A prediction model for the temperature of the molten steel during the LF refining is acquired according to the process data of the LF refining and the target temperature of the molten steel during the LF refining.

Optionally, the S2 may include S21 to S24 as follows:

S21, An actual temperature of the molten steel during the LF refining is calculated according to the target temperature of the molten steel during the LF refining.

Specifically, the actual temperature $T_1$ of the molten steel during the LF refining is calculated according to the target temperature of the molten steel during the LF refining and a thermal equilibrium, as shown in the following formula (1):

$$T_1 = T_{measured} - \Delta T_{addition} \quad (1)$$

where $T_{measured}$ represents the target temperature of the molten steel during the LF refining, $T_{measured}$ represents a temperature change of the molten steel caused by an added material (alloy material/slag-making material/silicon-calcium wire), $\Delta T_{addition} = \Sigma_i G_i q_i$, i represents an added material (alloy material or slag-making material), $G_i$ represents a weight of an added material i (kg), and $q_i$ represents a temperature effect coefficient of an added material i (° C./kg).

Influence coefficients of addition amounts of different added materials on a temperature change of a molten steel are shown in Table 2.

TABLE 2

Influence coefficients of addition amounts of different added materials on a temperature change of a molten steel

| Added material | Temperature effect coefficient ×10$^{-2}$ (° C./kg) | Added material | Temperature effect coefficient ×10$^{-2}$ (° C./kg) |
|---|---|---|---|
| High-carbon ferromanganese | −1.30 | Lime | −2.00 |
| Aluminum wire | −0.5 | Slag agent | −2.00 |
| CaSi wire | −1.10 | | |

S22, A model data set is constructed according to the actual temperature of the molten steel during the LF refining and the key factor parameters, preprocessed, and then divided into a training set and a test set.

Optionally, the preprocessing in the S22 includes deleting repeating data and abnormal data.

The abnormal data includes abnormal data (such as NULL, 9999, and 0000) caused by a sensor failure, heat data when a molten steel weight is lower than a minimum processing capacity or higher than a maximum processing capacity, heat data when a heating time during the LF refining is longer than 1,800 s, and heat data when a composition of a molten steel at a refining end point is not in a target composition range of a target steel grade.

In a feasible embodiment, the key factor parameters affecting a temperature change of the molten steel during the LF refining and the actual temperature $T_1$ of the molten steel during the LF refining are constructed into the model data set, and the model dataset is subjected to data preprocessing.

S23, Machine learning models are subjected to hyperparameter optimization based on the training set, k-fold cross-validation, and a hyperparameter optimization method to obtain optimal hyperparameters for a plurality of machine learning models.

The hyperparameter optimization method may include a random search technique, a BO technique, and a GWO technique.

The machine learning models can include an XGBoost model and an LGBM model.

In a feasible embodiment, 8,962 groups of data obtained are divided into a training set and a test set, where 80% of the data is used as the training set for training the machine learning models and 20% of the data is used as the test set for evaluating the machine learning models. Through 10-fold cross-validation, the training set is divided into 10 parts, where 9 parts are used as a training set and 1 part is used as a validation set. The machine learning models (the XGBoost model and the LGBM model) are subjected to hyperparameter optimization by the random search technique, the BO technique, and the GWO technique to finally obtain optimal hyperparameters for different machine learning models, as shown in Table 3.

S24, The plurality of machine learning models are evaluated according to the test set after the hyperparameter optimization, and an optimal prediction model for the temperature of the molten steel during the LF refining is acquired according to performance indexes of the plurality of machine learning models.

Optionally, the performance indexes in the S24 include one or more selected from the group consisting of a determination coefficient $R^2$, an RMSE, an MAE, and a hit rate within a preset error range.

Specifically, an evaluation criterion can include: the $R^2$ is the highest, the RMES is the lowest, the MAE is the lowest, and/or the hit rate within the error range is the highest, where the error range can be ±5° C.

In a feasible embodiment, in a hyperparameter space for the machine learning models, machine learning-based prediction models for the temperature of the molten steel during the LF refining are subjected to hyperparameter optimization by different hyperparameter optimization methods based on the training set and the k-fold cross-validation, an optional machine learning model is evaluated with the test set, and performance indexes of the machine learning models are compared to obtain a machine learning model with optimal performance indexes.

Performance indexes of different machine learning models are shown in Table 4.

TABLE 4

Performance indexes of different machine learning models

| Model | Performance indexes | | | |
|---|---|---|---|---|
| | $R^2$ | RMSE | MAE | Hit rate in a range of ±5° C./% |
| XGoost | 0.8709 | 3.373 | 2.4916 | 87.84 |
| BO-XGoost | 0.8753 | 3.3147 | 2.4677 | 88.85 |
| GWO-XGoost | 0.8813 | 3.2341 | 2.4 | 88.96 |
| LGBM | 0.872 | 3.358 | 2.4808 | 88.12 |
| BO-LGBM | 0.8736 | 3.3377 | 2.4695 | 88.34 |
| GWO-LGBM | 0.8823 | 3.2207 | 2.3668 | 89.35 |

TABLE 3

Optimal hyperparameters for different machine learning models

| Model | Hyperparameter | Hyperparameter range | Random search | BO | GWO |
|---|---|---|---|---|---|
| XGBoost model | max_depth (int) | [2, 10] | 8 | 10 | 10 |
| | learning_rate(float) | [0.01, 1] | 0.23 | 0.22 | 0.082 |
| | n_estimators(int) | [20, 200] | 170 | 186 | 198 |
| | gamma(float) | [3, 6] | 3 | 5.17 | 4.54 |
| | min_child_weight (float) | [1, 3] | 2 | 1.43 | 1.28 |
| | subsample(float) | [0.5, 1] | 0.875 | 0.68 | 0.66 |
| | colsample_bytree(float) | [0.5, 1] | 0.75 | 0.95 | 1 |
| | reg_alpha(float) | [0, 100] | 20 | 28.90 | 5.57 |
| | reg_lambda(float) | [0, 100] | 40 | 36.24 | 0 |
| LGBM model | num_leaves (int) | [2, 100] | 82 | 51 | 100 |
| | learning_rate (float) | [0.01, 1] | 0.34 | 0.25 | 0.085 |
| | n_estimators (int) | [20, 300] | 240 | 270 | 295 |
| | min_gain_to_split(float) | [1, 6] | 1 | 1.46 | 1.027 |
| | min_sum_hessian_in_leaf (float) | [1, 6] | 1 | 5.67 | 4.925 |
| | bagging_fraction(float) | [0.1, 1] | 0.325 | 0.531 | 0.36 |
| | feature_fraction(float) | [0.1, 1] | 1 | 0.89 | 1 |
| | reg_alpha(float) | [0, 50] | 0 | 11.20 | 2.15 |
| | reg_lambda(float) | [0, 50] | 45 | 43.39 | 37.04 |

Obviously, the optimal model based on the embodiment of the present disclosure is GWO-LGBM, which consists of the following four major parameters: Column, Count, Gain, and Leaf. Column represents a feature column selected on a node of a decision tree for partitioning. Node partitioning depends on a value of a particular feature. Count represents a number of training samples in a node. Gain represents an information gain produced after partitioning of the current features. An information gain is an index for measuring an improvement degree of a purity of a sample set before and after partitioning. In a GWO-LGBM tree, for each partition, the optimal partition features are selected based on an information gain. Leaf represents whether the current node is a leaf node. Each node in a decision tree is either an internal node for further partitioning or a final leaf node. A leaf node is a final output of a decision tree and represents a predicted value of a sample.

S3, A base value $T_{basevalue}$ for prediction of the temperature of the molten steel, SHAP values of key factor parameters, and a relationship trend between the key factor parameters and the SHAP values are calculated according to the prediction model for the temperature of the molten steel during the LF refining.

The relationship trend includes a relationship trend between a refining time and an SHAP value, a relationship trend between an electrode heating time and an SHAP value, and a relationship trend between an argon consumption and an SHAP value.

In a feasible embodiment, a relationship trend between a refining time, an electrode heating time, or an argon consumption and an SHAP value is obtained as follows: a parameter is input into a shap.TreeExplainer module in the Python language to obtain an SHAP value corresponding to the parameter, and then the SHAP value is fitted with the corresponding parameter.

Further, through a change trend and distribution of an SHAP value, the influence of a key factor parameter affecting a temperature change of a molten steel on a temperature of a molten steel is further investigated. When an SHAP value is positive, it indicates that a corresponding key factor parameter affecting a temperature change of a molten steel has a positive impact on a predicted value of a temperature of a molten steel, namely, an increase of the temperature of the molten steel. On the contrary, when an SHAP value is negative, it indicates that a corresponding key factor parameter affecting a temperature change of a molten steel has a negative impact on a predicted value of a temperature of a molten steel, namely, an increase of the temperature of the molten steel.

S4, A predicted value of the temperature of the molten steel during the LF refining is calculated according to the base value for the prediction of the temperature of the molten steel and the SHAP values of the key factor parameters, and a control result for the temperature of the molten steel during the LF refining is acquired according to the relationship trend and the predicted value of the temperature of the molten steel during the LF refining. Optionally, the S4 may include S41 to S42 as follows:

S41, The predicted value $T_{predict}$ of the temperature of the molten steel during the LF refining is calculated according to the base value for the prediction of the temperature of the molten steel and the SHAP values, as shown in the following formula (2):

$$T_{predict} = T_{basevalue} + \Sigma_j SHAPvalue_j \quad (2)$$

where $T_{basevalue}$ represents the base value for the prediction of the temperature of the molten steel, j represents a key factor parameter, and $SHAPvalue_j$ represents an SHAP value corresponding to the key factor parameter j; and S42, a difference between the predicted value of the temperature of the molten steel during the LF refining and an actual temperature of the molten steel during the LF refining is calculated, and the corresponding key factor parameters are adjusted according to the relationship trend until the difference is within a preset range to obtain adjusted key factor parameters, so as to obtain the control result for the temperature of the molten steel during the LF refining.

In a feasible embodiment, the corresponding parameters are adjusted according to the relationship trend until a difference between an adjusted predicted value and the actual temperature of the molten steel is within a required range to obtain process parameters for accurate control.

For example:

Example 1: In this example, an actual temperature $T_1$ of a molten steel during LF refining is 1,604.51° C., a base value $T_{basevalue}$ for prediction of a temperature of the molten steel that is calculated based on the optimal model GWO-LGBM is 1,603.43° C., and a shap.TreeExplainer module in the Python language is adopted. Key factor parameters ($X_1$=53 min, $X_2$=148,100 kg, $X_3$=1,596° C., $X_4$=43 min, $X_5$=719 s, and $X_6$=1.6×10$^4$ NL) are input into the module to obtain the following SHAP values corresponding to the key factor parameters: $SHAPvalue_1$=0.74, $SHAPvalue_2$=1.28, $SHAPvalue_3$=6.44, $SHAPvalue_4$=−0.9, $SHAPvalue_5$=−2.13, and $SHAPvalue_6$=−0.25. When an SHAP value is positive, it indicates that a corresponding key factor parameter has a positive impact on a predicted value. When an SHAP value is negative, it indicates that a corresponding key factor parameter has a negative impact on a predicted value. An SHAP trend graph (a dependence graph) of each key factor parameter is obtained, as shown in FIG. 2a to FIG. 2f.

It is calculated according to the formula (2) that a predicted value of a temperature of the molten steel during the LF refining is 1,608.61° C., and it can be known that a difference between the predicted value $T_{predict}$ and the actual temperature $T_1$ (1,604.51° C.) of the molten steel is 4.1° C. Based on this, one of the following methods can be selected for key parameter adjustment: 1) When a parameter value closest to $SHAPvalue_4$=−5 is selected as 63 min ($SHAPvalue_4$=−5.17) or 65 min ($SHAPvalue_4$=−4.77) according to an SHAP trend graph (dependence graph) of a corresponding key factor parameter, a refining time is adjusted to 63 min or 65 min for actual LF refining, and a temperature of a molten steel at an end point of the LF refining is 1,604.34° C. or 1,604.74° C. and has a deviation of 0.17° C. or 0.23° C. from $T_1$. 2) When a parameter value closest to $SHAPvalue_5$=−6.23 is selected as 612 s ($SHAPvalue_5$=−6.22) or 583 s ($SHAPvalue_5$=−6.24) according to an SHAP trend graph (dependence graph) of a corresponding key factor parameter, an electrode heating time is adjusted to 612 s or 583 s for actual LF refining, and a temperature of a molten steel at an end point of the LF refining is 1,604.52° C. or 1604.50° C. and has a deviation of 0.01° C. from $T_1$. 3) When a parameter value closest to $SHAPvalue_6$=−4.35 is selected as 3.3×10$^{5NL}$ ($SHAPvalue_6$=−4.35) according to an SHAP trend graph (dependence graph) of a corresponding key factor parameter, an argon consumption is adjusted to 3.3× 10$^5$ NL for actual LF refining, and a temperature of a molten steel at an end point of the LF refining is 1,604.51° C. and has a deviation of 0° C. from $T_1$.

Example 2: In this example, an actual temperature $T_1$ of a molten steel during LF refining is 1,598.91° C., a base value $T_{basevalue}$ for prediction of a temperature of the molten steel that is calculated based on the optimal model GWO-LGBM is 1,603.43° C., and a shap.TreeExplainer module in the Python language is adopted. Key factor parameters ($X_1$=61 min, $X_2$=152,500 kg, $X_3$=1,572° C., $X_4$=51 min, $X_5$=785 s, and $X_6$=4.4×10$^4$ NL) are input into the module to obtain the following SHAP values corresponding to the key factor parameters: SHAPvalue$_1$=0.28, SHAPvalue$_2$=−2.38, SHAPvalue$_3$=1.52, SHAPvalue$_4$=−0.18, SHAPvalue$_5$=−0.71, and SHAPvalue$_6$=−5.37. When an SHAP value is positive, it indicates that a corresponding key factor parameter has a positive impact on a predicted value. When an SHAP value is negative, it indicates that a corresponding key factor parameter has a negative impact on a predicted value. An SHAP trend graph (a dependence graph) of each key factor parameter is obtained, as shown in FIG. 2a to FIG. 2f.

It is calculated according to the formula (2) that a predicted value of a temperature of the molten steel during the LF refining is 1,596.59° C., and it can be known that a difference between the predicted value $T_{predict}$ and the actual temperature $T_1$ (1,598.91° C.) of the molten steel is −2.32° C. Based on this, one of the following methods can be selected for key parameter adjustment: 1) When a parameter value closest to SHAPvalue$_4$=2.14 is selected as 63 min (SHAPvalue$_4$=2.18) according to an SHAP trend graph (dependence graph) of a corresponding key factor parameter, a refining time is adjusted to 63 min for actual LF refining, and a temperature of a molten steel at an end point of the LF refining is 1,598.95° C. and has a deviation of 0.04° C. from $T_1$. 2) When a parameter value closest to SHAPvalue$_5$=1.61 is selected as 781 s (SHAPvalue$_5$=1.61) according to an SHAP trend graph (dependence graph) of a corresponding key factor parameter, an electrode heating time is adjusted to 781 s for actual LF refining, and a temperature of a molten steel at an end point of the LF refining is 1,598.91° C. and has a deviation of 0° C. from $T_1$. 3) When a parameter value closest to SHAPvalue$_6$=−3.05 is selected as 3.6×10$^5$ NL (SHAPvalue$_6$=−3.05) according to an SHAP trend graph (dependence graph) of a corresponding key factor parameter, an argon consumption is adjusted to 3.6×10$^5$ NL for actual LF refining, and a temperature of a molten steel at an end point of the LF refining is 1,598.91° C. and has a deviation of 0° C. from $T_1$.

Example 3: In this example, an actual temperature $T_1$ of a molten steel during LF refining is 1594.24° C., a base value $T_{basevalue}$ for prediction of a temperature of the molten steel that is calculated based on the optimal model GWO-LGBM is 1,603.43° C., and a shap.TreeExplainer module in the Python language is adopted. Key factor parameters ($X_1$=45 min, $X_2$=152,900 kg, $X_3$=1,566° C., $X_4$=38 min, $X_5$=796 s, and $X_6$=3.8×10$^4$ NL) are input into the module to obtain the following SHAP values corresponding to the key factor parameters: SHAPvalue$_1$=−0.34, SHAPvalue$_2$=−2.19, SHAPvalue$_3$=1.1, SHAPvalue$_4$=−0.87, SHAPvalue$_5$=0.11, and SHAPvalue$_6$=−5.86. When an SHAP value is positive, it indicates that a corresponding key factor parameter has a positive impact on a predicted value. When an SHAP value is negative, it indicates that a corresponding key factor parameter has a negative impact on a predicted value. An SHAP trend graph (a dependence graph) of each key factor parameter is obtained, as shown in FIG. 2a to FIG. 2f.

It is calculated according to the formula (2) that a predicted value of a temperature of the molten steel during the LF refining is 1596.59° C., and it can be known that a difference between the predicted value $T_{predict}$ and the actual temperature $T_1$ (1,594.24° C.) of the molten steel is 1.14° C. Based on this, one of the following methods can be selected for key parameter adjustment: 1) When a parameter value closest to SHAPvalue$_4$=−2.01 is selected as 53 min (SHAPvalue$_4$=−2.01) according to an SHAP trend graph (dependence graph) of a corresponding key factor parameter, a refining time is adjusted to 53 min for actual LF refining, and a temperature of a molten steel at an end point of the LF refining is 1,594.24° C. and has a deviation of 0° C. from $T_1$. 2) When a parameter value closest to SHAPvalue$_5$=−1.03 is selected as 781 s (SHAPvalue$_5$=−1.02) according to an SHAP trend graph (dependence graph) of a corresponding key factor parameter, an electrode heating time is adjusted to 781 s for actual LF refining, and a temperature of a molten steel at an end point of the LF refining is 1,594.25° C. and has a deviation of 0.01° C. from $T_1$. 3) When a parameter value closest to SHAPvalue$_6$=−7 is selected as 4.0×10$^5$ NL (SHAPvalue$_6$=−7.05) according to an SHAP trend graph (dependence graph) of a corresponding key factor parameter, an argon consumption is adjusted to 4.0×10$^5$ NL for actual LF refining, and a temperature of a molten steel at an end point of the LF refining is 1,594.19° C. and has a deviation of 0.05° C. from $T_1$.

Example 4: In this example, an actual temperature $T_1$ of a molten steel during LF refining is 1619° C., a base value $T_{basevalue}$ for prediction of a temperature of the molten steel that is calculated based on the optimal model GWO-LGBM is 1,603.43° C., and a shap.TreeExplainer module in the Python language is adopted. Key factor parameters ($X_1$=70 min, $X_2$=157390 kg, $X_3$=1554° C., $X_4$=58 min, $X_5$=1,192 s, and $X_6$=3.1×10$^4$ NL) are input into the module to obtain the following SHAP values corresponding to the key factor parameters: SHAPvalue$_1$=−0.01, SHAPvalue$_2$=0.67, SHAPvalue$_3$=0.82, SHAPvalue$_4$=−0.29, SHAPvalue$_5$=18.52, and SHAPvalue$_6$=−0.15. When an SHAP value is positive, it indicates that a corresponding key factor parameter has a positive impact on a predicted value. When an SHAP value is negative, it indicates that a corresponding key factor parameter has a negative impact on a predicted value. An SHAP trend graph (a dependence graph) of each key factor parameter is obtained, as shown in FIG. 2a to FIG. 2f.

It is calculated according to the formula (2) that a predicted value of a temperature of the molten steel during the LF refining is 1596.59° C., and it can be known that a difference between the predicted value $T_{predict}$ and the actual temperature $T_1$ (1619° C.) of the molten steel is 3.99° C. Based on this, one of the following methods can be selected for key parameter adjustment: 1) When a parameter value closest to SHAPvalue$_4$=−4.28 is selected as 65 min (SHAPvalue$_4$=−4.77) according to an SHAP trend graph (dependence graph) of a corresponding key factor parameter, a refining time is adjusted to 65 min for actual LF refining, and a temperature of a molten steel at an end point of the LF refining is 1,618.51° C. and has a deviation of 0.49° C. from $T_1$. 2) When a parameter value closest to SHAPvalue$_5$=14.53 is selected as 1,254 s (SHAPvalue$_5$=14.58) according to an SHAP trend graph (dependence graph) of a corresponding key factor parameter, an electrode heating time is adjusted to 1,254 s for actual LF refining, and a temperature of a molten steel at an end point of the LF refining is 1,619.05° C. and has a deviation of 0.05° C. from $T_1$. 3) When a parameter value closest to SHAPvalue$_6$=−4.14 is selected as 3.2× 10$^5$ NL (SHAPvalue$_6$=−4.13) according to an SHAP trend graph (dependence graph) of a corresponding key factor parameter, an argon consumption is adjusted to 3.2× 10$^5$ NL for actual LF refining, and a temperature of a molten steel at an end point of the LF refining is 1,619.01° C. and has a deviation of 0.01° C. from $T_1$.

In the embodiment of the present disclosure, actual working conditions of LF refining can be adjusted, which is conducive to enhancing the understanding of operators for decision-making of models. The present disclosure can guide an operator to make an accurate, scientific, and reasonable decision for the adjustment of process parameters in an actual operation, thereby improving a production efficiency, optimizing the process parameters, allowing the accurate control of a temperature of a molten steel, ensuring a quality of a molten steel, and reducing a production risk.

Figure 3:
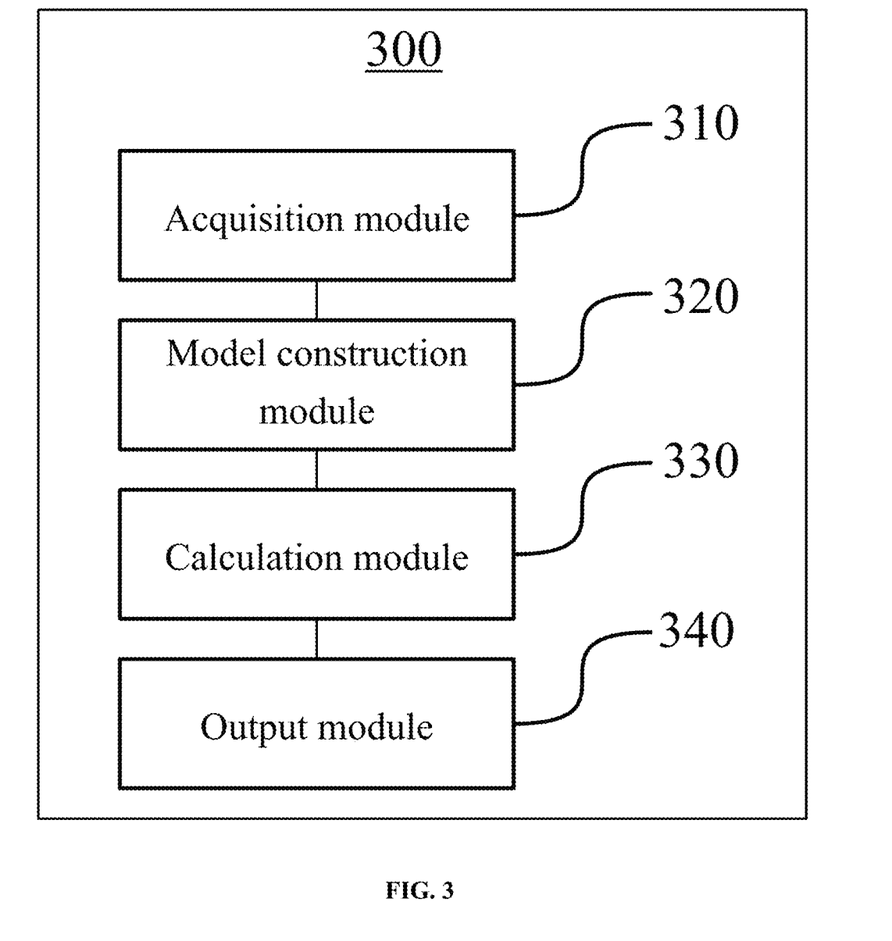
FIG. 3 is a block diagram of a device for controlling a temperature of a molten steel during LF refining based on interpretable machine learning provided in an embodiment of the present disclosure.

As shown in FIG. 3, an embodiment of the present disclosure provides a device 300 for controlling a temperature of a molten steel during LF refining based on interpretable machine learning. The device 300 is configured to implement the method for controlling a temperature of a molten steel during LF refining based on interpretable machine learning. The device 300 includes:

an acquisition module 310 configured to acquire process data of the LF refining and a target temperature of the molten steel during the LF refining;

a model construction module 320 configured to acquire a prediction model for the temperature of the molten steel during the LF refining according to the process data of the LF refining and the target temperature of the molten steel during the LF refining;

a calculation module 330 configured to calculate a base value for prediction of the temperature of the molten steel, SHAP values of key factor parameters, and a relationship trend between the key factor parameters and the SHAP values according to the prediction model for the temperature of the molten steel during the LF refining; and an output module 340 configured to calculate a predicted value of the temperature of the molten steel during the LF refining according to the base value for the prediction of the temperature of the molten steel and the SHAP values of the key factor parameters, and acquire a control result for the temperature of the molten steel during the LF refining according to the relationship trend and the predicted value of the temperature of the molten steel during the LF refining.

Optionally, the process data of the LF refining includes the key factor parameters affecting a change of the temperature of the molten steel and amounts of added materials.

The key factor parameters include a turnover cycle of ladle, a molten steel weight, a starting temperature of molten steel, a refining time, an electrode heating time, and an argon consumption.

The added materials include an alloy material, a slag-making material, and a silicon-calcium wire.

Optionally, the model construction module 320 is further configured to:

S21, calculate an actual temperature of the molten steel during the LF refining according to the target temperature of the molten steel during the LF refining;

S22, construct a model data set according to the actual temperature of the molten steel during the LF refining and the key factor parameters, preprocess the model data set to obtain a preprocessed model data set, and divide the preprocessed model data set into a training set and a test set;

S23, subject machine learning models to hyperparameter optimization based on the training set, k-fold cross-validation, and a hyperparameter optimization method to obtain optimal hyperparameters for a plurality of machine learning models; and S24, evaluate the plurality of machine learning models according to the test set after the hyperparameter optimization, and acquire an optimal prediction model for the temperature of the molten steel during the LF refining according to performance indexes of the plurality of machine learning models.

Optionally, the model construction module 320 is further configured to:

calculate the actual temperature $T_1$ of the molten steel during the LF refining according to the target temperature of the molten steel during the LF refining and a thermal equilibrium, as shown in the following formula (1):

$$T_1 = T_{measured} - \Delta T_{addition} \quad (1)$$

where $T_{measured}$ represents the target temperature of the molten steel during the LF refining and $\Delta T_{addition}$ represents a temperature change of the molten steel caused by an added material.

Optionally, the preprocessing includes deleting repeating data and abnormal data.

The abnormal data includes abnormal data caused by a sensor failure, heat data when a molten steel weight is lower than a minimum processing capacity or higher than a maximum processing capacity, heat data when a heating time during the LF refining is longer than a preset time, and heat data when a composition of a molten steel at a refining end point is not in a target composition range of a target steel grade.

Optionally, the hyperparameter optimization method includes a random search technique, a BO technique, and a GWO technique.

Optionally, the machine learning models include an XGBoost model and an LGBM model.

Optionally, the performance indexes include a determination coefficient $R^2$, an RMSE, an MAE, and a hit rate within a preset error range.

Optionally, the output module 330 is further configured to:

S41, calculate the predicted value $T_{predict}$ of the temperature of the molten steel during the LF refining according to the base value for the prediction of the temperature of the molten steel and the SHAP values of the key factor parameters, as shown in the following formula (2):

$$T_{predict} = T_{basevalue} + \Sigma_j \text{SHAPvalue}_j \quad (2)$$

where $T_{basevalue}$ represents the base value for the prediction of the temperature of the molten steel, j represents a key factor parameter, and $\text{SHAPvalue}_j$ represents an SHAP value corresponding to the key factor parameter j; and S42, calculate a difference between the predicted value of the temperature of the molten steel during the LF refining and an actual temperature of the molten steel during the LF refining, and adjust the key factor parameters according to the relationship trend until the difference is within a preset range to obtain adjusted key factor parameters, so as to obtain the control result for the temperature of the molten steel during the LF refining.

In the embodiment of the present disclosure, actual working conditions of LF refining can be adjusted, which is conducive to enhancing the understanding of operators for decision-making of models. The present disclosure can guide an operator to make an accurate, scientific, and reasonable decision for the adjustment of process parameters in an actual operation, thereby improving a production efficiency, optimizing the process parameters, allowing the accurate control of a temperature of a molten steel, ensuring a quality of a molten steel, and reducing a production risk.

Figure 4:
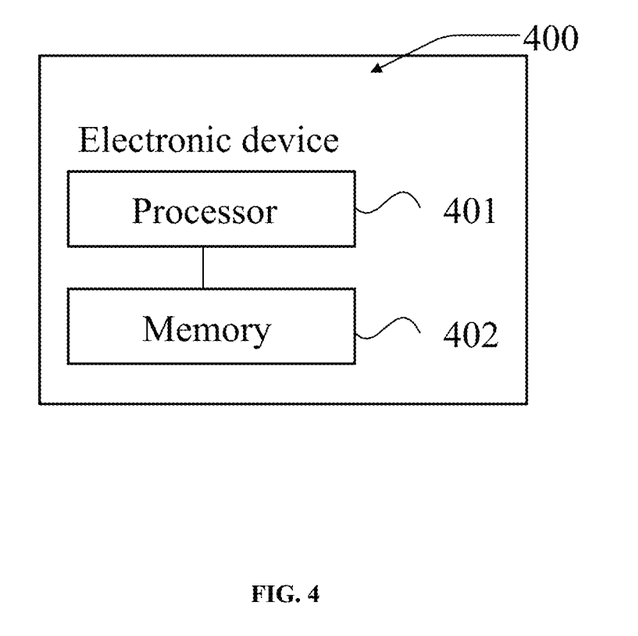
FIG. 4 is a schematic structural diagram of an electronic device provided in an embodiment of the present disclosure.

FIG. 4 is a schematic structural diagram of an electronic device 400 provided in an embodiment of the present disclosure. The electronic device 400 may vary greatly due to different configurations or properties, and may include one or more processors (central processing units (CPUs)) 401 and one or more memories 402. At least one instruction is stored in the one or more memories 402, and the at least one instruction is loaded and executed by the one or more processors 401 to implement the following method for controlling a temperature of a molten steel during LF refining based on interpretable machine learning:

S1, Process data of the LF refining and a target temperature of the molten steel during the LF refining are acquired.

S2, A prediction model for the temperature of the molten steel during the LF refining is acquired according to the process data of the LF refining and the target temperature of the molten steel during the LF refining.

S3, A base value for prediction of the temperature of the molten steel, SHAP values of key factor parameters, and a relationship trend between the key factor parameters and the SHAP values are calculated according to the prediction model for the temperature of the molten steel during the LF refining.

S4, A predicted value of the temperature of the molten steel during the LF refining is calculated according to the base value for the prediction of the temperature of the molten steel and the SHAP values of the key factor parameters, and a control result for the temperature of the molten steel during the LF refining is acquired according to the relationship trend and the predicted value of the temperature of the molten steel during the LF refining.

In an exemplary embodiment, a computer-readable storage medium is also provided, such as a memory including an instruction, where the instruction can be executed by a processor in a terminal to complete the method for controlling a temperature of a molten steel during LF refining based on interpretable machine learning. For example, the computer-readable storage medium may be a read-only memory (ROM), a random-access memory (RAM), a compact disc read-only memory (CD-ROM), a magnetic tape, a floppy disk, an optical data storage device, or the like.

Those of ordinary skill in the art can understand that all or some of the steps in the above embodiments may be implemented by hardware, or by instructing related hardware by using a program. The program may be stored in a computer-readable storage medium. The storage medium may be an ROM, a disk, a compact disc, or the like.

The above are merely preferred embodiments of the present disclosure, and are not intended to limit the present disclosure. Any modifications, equivalent replacements, improvements, and the like made within the spirit and principle of the present disclosure shall be all included in the protection scope of the present disclosure.

What is claimed is:

1. A method for controlling a temperature of a molten steel during ladle furnace (LF) refining based on interpretable machine learning, comprising:
   S1, acquiring process data of the LF refining and a target temperature of the molten steel during the LF refining;
   S2, acquiring a prediction model for the temperature of the molten steel during the LF refining according to the process data of the LF refining and the target temperature of the molten steel during the LF refining;
   S3, calculating a base value for prediction of the temperature of the molten steel, SHapley Additive explanations (SHAP) values of key factor parameters, and a relationship trend between the key factor parameters and the SHAP values according to the prediction model for the temperature of the molten steel during the LF refining; and
   S4, calculating a predicted value of the temperature of the molten steel during the LF refining according to the base value for the prediction of the temperature of the molten steel and the SHAP values of the key factor parameters, and acquiring a control result for the temperature of the molten steel during the LF refining according to the relationship trend and the predicted value of the temperature of the molten steel during the LF refining;
   wherein the S4 comprises:
   S41, calculating the predicted value $T_{predict}$ according to the following formula (2):

$$T_{predict} = T_{basevalue} + \Sigma_j \text{SHAPvalue}_j \qquad (2)$$

wherein $T_{predict}$ represents the predicted value of the temperature of the molten steel during the LF refining, $T_{basevalue}$ represents the base value for the prediction of the temperature of the molten steel, j represents a key factor parameter, and $\text{SHAPvalue}_j$ represents an SHAP value corresponding to the key factor parameter j; and
   S42, calculating a difference between the predicted value of the temperature of the molten steel during the LF refining and an actual temperature of the molten steel during the LF refining, and adjusting the key factor parameters according to the relationship trend until the difference is within a preset range to obtain adjusted key factor parameters, so as to obtain the control result for the temperature of the molten steel during the LF refining;
   the S2 comprises:
   S21, calculating an actual temperature of the molten steel during the LF refining according to the target temperature of the molten steel during the LF refining;
   S22, constructing a model data set according to the actual temperature of the molten steel during the LF refining and the key factor parameters, preprocessing the model data set to obtain a preprocessed model data set, and dividing the preprocessed model data set into a training set and a test set;
   S23, performing hyperparameter optimization on machine learning models based on the training set, k-fold cross-validation, and a hyperparameter optimization method to obtain optimal hyperparameters for a plurality of machine learning models; and
   S24, evaluating the plurality of machine learning models according to the test set after the hyperparameter optimization, and acquiring an optimal prediction model for the temperature of the molten steel during the LF refining according to performance indexes of the plurality of machine learning models.

2. The method according to claim 1, wherein the process data of the LF refining in the S1 comprises the key factor parameters affecting a change of the temperature of the molten steel and amounts of added materials;
   the key factor parameters comprise a turnover cycle of ladle, a molten steel weight, a starting temperature of molten steel, a refining time, an electrode heating time, and an argon consumption; and
   the added materials comprise an alloy material, a slag-making material, and a silicon-calcium wire.

3. The method according to claim 1, wherein the calculating an actual temperature of the molten steel during the LF refining according to the target temperature of the molten steel during the LF refining in the S21 comprises:
calculating the actual temperature $T_1$ of the molten steel during the LF refining according to the target temperature of the molten steel during the LF refining and a thermal equilibrium, as shown in the following formula (1):

$$T_1 = T_{measured} - \Delta T_{addition} \quad (1)$$

wherein $T_{measured}$ represents the target temperature of the molten steel during the LF refining and $\Delta T_{addition}$ represents a temperature change of the molten steel caused by an added material.

4. The method according to claim 1, wherein the preprocessing in the S22 comprises deleting repeating data and abnormal data,
wherein the abnormal data comprises abnormal data caused by a sensor failure, heat data when a molten steel weight is lower than a minimum processing capacity or higher than a maximum processing capacity, heat data when a heating time during the LF refining is longer than a preset time, and heat data when a composition of a molten steel at a refining end point is not in a target composition range of a target steel grade.

5. The method according to claim 1, wherein the hyperparameter optimization method in the S23 comprises a random search technique, a Bayesian optimization (BO) technique, and a grey wolf optimization (GWO) technique.

6. The method according to claim 1, wherein the machine learning models in the S23 comprise an extreme gradient boosting (XGBoost) model and a light gradient boosting machine (LGBM) model.

7. The method according to claim 1, wherein the performance indexes in the S24 comprise a determination coefficient $R^2$, a root mean square error (RMSE), a mean absolute error (MAE), and a hit rate within a preset error range.

8. A device for controlling a temperature of a molten steel during LF refining based on interpretable machine learning, comprising:
an acquisition module configured to acquire process data of the LF refining and a target temperature of the molten steel during the LF refining;
a model construction module configured to acquire a prediction model for the temperature of the molten steel during the LF refining according to the process data of the LF refining and the target temperature of the molten steel during the LF refining;
a calculation module configured to calculate a base value for prediction of the temperature of the molten steel, SHAP values of key factor parameters, and a relationship trend between the key factor parameters and the SHAP values according to the prediction model for the temperature of the molten steel during the LF refining; and
an output module configured to calculate a predicted value of the temperature of the molten steel during the LF refining according to the base value for the prediction of the temperature of the molten steel and the SHAP values of the key factor parameters, and acquire a control result for the temperature of the molten steel during the LF refining according to the relationship trend and the predicted value of the temperature of the molten steel during the LF refining;
wherein the output module is further configured to:
calculate the predicted value $T_{predict}$ according to the following formula (2):

$$T_{predict} = T_{basevalue} + E_j SHAPvalue_j \quad (2)$$

wherein $T_{predict}$ represents the predicted value of the temperature of the molten steel during the LF refining, $T_{basevalue}$ represents the base value for the prediction of the temperature of the molten steel, j represents a key factor parameter, and $SHAPvalue_j$ represents an SHAP value corresponding to the key factor parameter j; and
calculate a difference between the predicted value of the temperature of the molten steel during the LF refining and an actual temperature of the molten steel during the LF refining, and adjust the key factor parameters according to the relationship trend until the difference is within a preset range to obtain adjusted key factor parameters, so as to obtain the control result for the temperature of the molten steel during the LF refining;
the model construction module is further configured to:
calculate an actual temperature of the molten steel during the LF refining according to the target temperature of the molten steel during the LF refining;
construct a model data set according to the actual temperature of the molten steel during the LF refining and the key factor parameters, preprocess the model data set to obtain a preprocessed model data set, and divide the preprocessed model data set into a training set and a test set;
perform hyperparameter optimization on machine learning models based on the training set, k-fold cross-validation, and a hyperparameter optimization method to obtain optimal hyperparameters for a plurality of machine learning models; and
evaluate the plurality of machine learning models according to the test set after the hyperparameter optimization, and acquire an optimal prediction model for the temperature of the molten steel during the LF refining according to performance indexes of the plurality of machine learning models.

* * * * *